(12) United States Patent
Tsuboi et al.

(10) Patent No.: US 8,294,694 B2
(45) Date of Patent: Oct. 23, 2012

(54) 3-DIMENSIONAL IMAGE DISPLAY DEVICE AND 3-DIMENSIONAL IMAGE DISPLAY METHOD

(75) Inventors: Masashi Tsuboi, Yokosuka (JP); Tsutomu Horikoshi, Kamakura (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 847 days.

(21) Appl. No.: 10/587,971

(22) PCT Filed: Feb. 9, 2005

(86) PCT No.: PCT/JP2005/001933
§ 371 (c)(1),
(2), (4) Date: Mar. 5, 2007

(87) PCT Pub. No.: WO2005/076054
PCT Pub. Date: Aug. 18, 2005

(65) Prior Publication Data
US 2008/0192310 A1    Aug. 14, 2008

(30) Foreign Application Priority Data

Feb. 9, 2004 (JP) .................. 2004-032486
Feb. 8, 2005 (JP) .................. 2005-032324

(51) Int. Cl.
*G06F 3/038* (2006.01)
*G09G 5/00* (2006.01)
*G03H 1/08* (2006.01)
*G03H 1/16* (2006.01)
*G02B 5/32* (2006.01)

(52) U.S. Cl. .............. 345/204; 359/9; 359/15; 359/16; 359/29

(58) Field of Classification Search .................. None
See application file for complete search history.

(56) References Cited

U.S. PATENT DOCUMENTS
2004/0021768 A1* 2/2004 Payne et al. ............... 348/51

FOREIGN PATENT DOCUMENTS
GB    2 363 273 A    12/2001
(Continued)

OTHER PUBLICATIONS

Piestun, R. and Shamir, J.; Synthesis of Three-Dimensional Light Fields and Applications, Proceedings of, vol. 90, No. 2, pp. 222-244; IEEE; Feb. 2002.*

(Continued)

*Primary Examiner* — Kee M Tung
*Assistant Examiner* — Carlos Perromat
(74) *Attorney, Agent, or Firm* — Oblon, Spivak, McClelland, Maier & Neustadt, L.L.P.

(57) ABSTRACT

A three-dimensional image display device is provided which allows a reduction in redundant calculation and high-speed obtainment of an optimum control image to be recorded on an optical wavefront control unit This invention relates to a three-dimensional image display device for displaying a three-dimensional image by irradiating illuminating light at an optical wavefront control unit which records a control image. The three-dimensional image display device of this invention includes a control image optimizing unit which calculates three-dimensional images corresponding to a group of control images based on constraints inherent to the optical wavefront control unit, selects a control image corresponding to a three-dimensional image satisfying a predetermined condition from the group of control images and records the selected control image on the optical wavefront control device.

3 Claims, 7 Drawing Sheets

FOREIGN PATENT DOCUMENTS

JP          2003 263094          9/2003

OTHER PUBLICATIONS

Yushigang, "Effective Method for Improvement of Computer-GeneratedHologram Reconstruction Quality", vol. 23, No. 4, Aug. 2003, pp. 225-228 (with English Abstract).

Nozaki Shinya et al., "An Adaptive Simulated Annealing Applied to Optimization of Phase Distribution of Kinoform", Dept. of Electrical and Electronic Eng., pp. 33-36, 1998.

Chen Yen-Wei et al., "A Fast Kinoform Optimization Algorithm Based on Simulated Annealing", IEICE Trans. Fundamentals, vol. E83-A, pp. 774-776, 2000.

Yoshikawa Nobukazu et al., "Phase Optimization of a Kinoform by Simulated Annealing", Applied Optics, vol. 33, pp. 863-868, 1994.

Masashi Tsuboi et al., "A Kinoform Optimization Algorithm Based on Simulated Annealing", The Institute of Electronics, Information and Communication Engineers Sogo Taikai Koen Ronbunshu Joho, p. 166, 2004.

* cited by examiner

FIG. 6

|  | RELATED ART | PRESENT INVENTION |
|---|---|---|
| INITIAL SOLUTION GENERATION | O (NlogN) | O (N) |
| SOLUTION EVALUATION (INITIAL SOLUTION) | O (NlogN) | O (N) |
| SOLUTION CHANGE (MOVE OPERATION) | O (1) | O (1) |
| SOLUTION EVALUATION (AFTER CHANGE) | O (N) | O (1) |

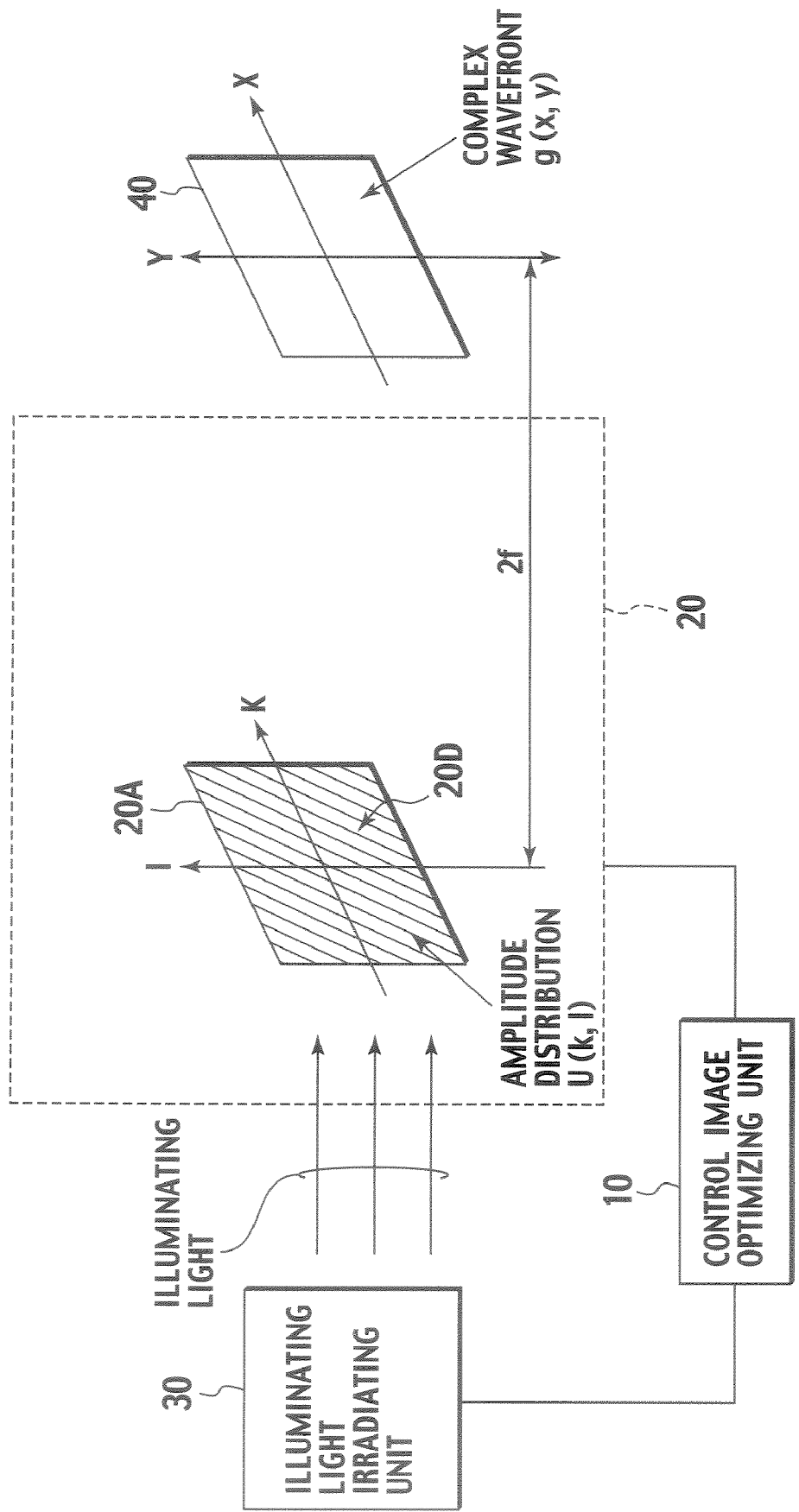

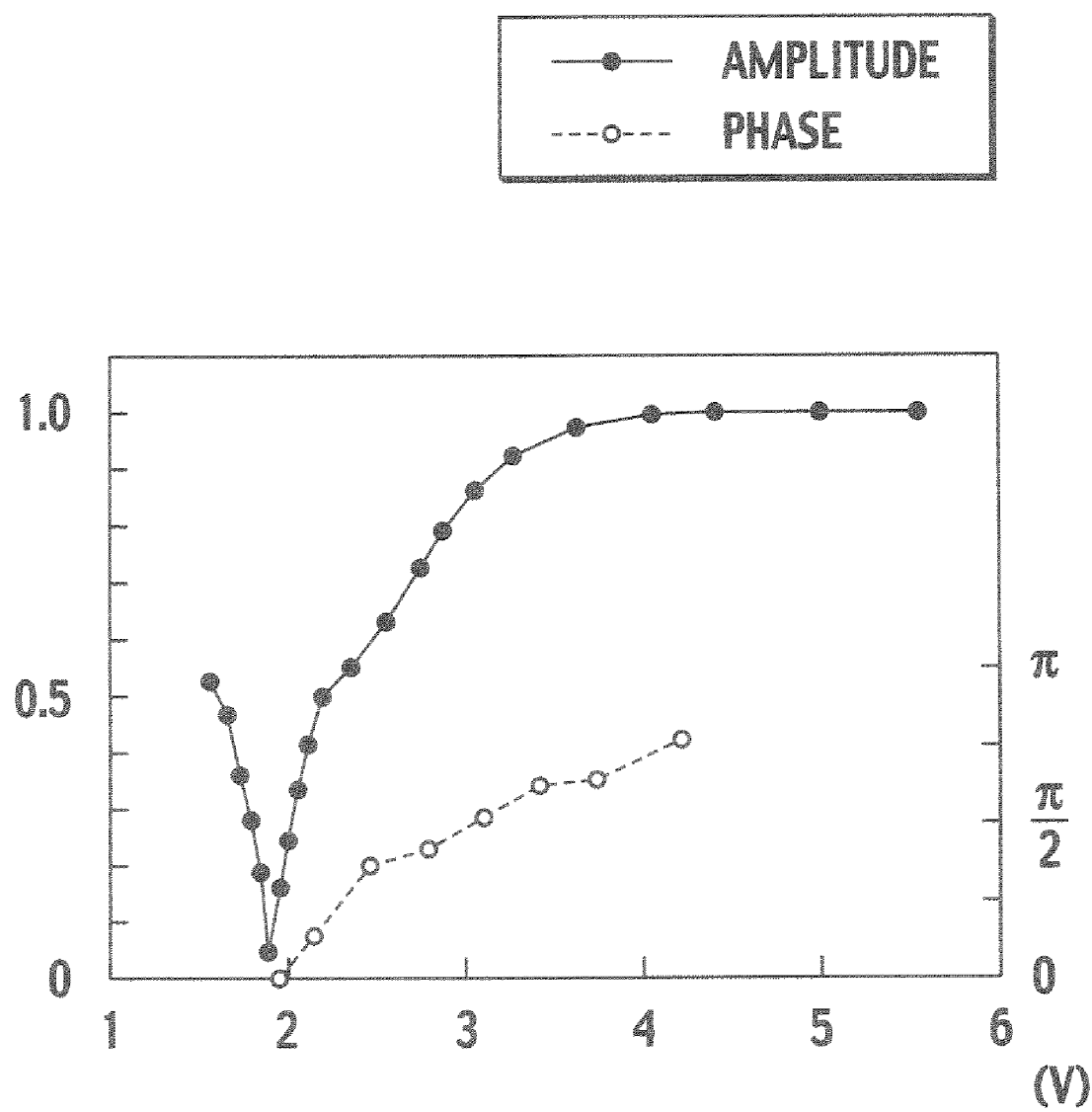

3-DIMENSIONAL IMAGE DISPLAY DEVICE AND 3-DIMENSIONAL IMAGE DISPLAY METHOD

TECHNICAL FIELD

The present invention relates to three-dimensional image display devices and three-dimensional imaged is play methods for displaying a three-dimensional image by irradiating illuminating light at an optical wavefront control unit which records a control image.

BACKGROUND ART

"Holography" has been known as a three-dimensional image display technique. Holography is a technique of reconstructing the optical wavefront of object light coming from an object as a three-dimensional image by irradiating illuminating light onto a display device on which a control image (an interference pattern of light in which phase or amplitude is controlled) is recorded There is a known holographic method in which a "kinoform" constituted by the phase distribution of an optical wavefront for modulating the phase of irradiated light is used. This method supposes that in a control image recorded on a display device, the amplitude of the optical wavefront is constant and only the phase of the optical wavefront is distributed.

In such a method, there is a known way using a "Simulated Annealing" method of determining the phase distribution of an optical wavefront optimum for reconstructing a three-dimensional image.

The "Simulated Annealing" method is a stochastic search method of obtaining an optimum solution by repeating an operation of changing a solution to another solution (Move operation), and searching a solution space.

In the "Simulated Annealing" method, when solution evaluation is elevated by a Move operation (that is, a solution is improved), the solution change by the Move operation is accepted.

On the other hand, in the "Simulated Annealing" method, when change by a Move operation worsens solution evaluation (that is, a solution is worsened), it is determined whether to accept the solution change by the Move operation or not (that is, whether to return the solution after the Move operation to the solution before the Move operation or not) based on the acceptance probability P (=exp(−ΔE/T)) which is calculated based on a parameter T representing "temperature" (hereinafter, temperature parameter T) and a worsened amount of ΔE.

Here, by gradually decreasing the temperature parameter T from a sufficiently high temperature after the start of experiment to a sufficiently low temperature, and controlling the above-described acceptance probability P, computation of local optimum solutions can be prevented.

In the above method, a comparison is made between an image to be reconstructed given as an input (hereinafter,input image) and a reconstructed image obtained by Fourier transforming the phase distribution of an optical wavefront on a kinoform, to evaluate solutions before and after a Move operation.

Since the calculation amount In the solution evaluation process is vast, a technique has been proposed in which solution evaluation is performed based on difference information about reconstructed images before and after a Move operation to shorten time for searching for an optimum solution in the "Simulated Annealing" method.

As described above, in the conventional three-dimensional image display technique, solution evaluation was performed based on difference information about reconstructed images before and after a Move operation to shorten time for searching for an optimum solution in the "Simulated Annealing" method.

However, the conventional three-dimensional image display technology has had the problem that since a control image obtained by Fourier transforming an input image is used as an initial solution in the "Simulated Annealing" method, when the fast Fourier transformation algorithm is used, a calculation amount of "O(NlogN)" where "N=($N_x$× $N_y$)" is the size of the input image (kinoform) is required for evaluating the initial solution, making it impossible to shorten much time for searching for an optimum solution.

The calculation amount of "O(NlogN)" means the complexity of the calculation is the order of NlogN.

Also, the conventional three-dimensional image display technique has had the problem that even though change of one point on a kinoform does not necessarily have an effect on every point of a reconstructed image due to the characteristics of a display device on which the kinoform is recorded, calculation s performed on the assumption that change of one point on the kinoform has an effect on every point of the reconstructed image, and thus, while the calculation amount in a solution evaluation after a Move operation can be reduced from the calculation amount "O(NlogN)" required for normal Fourier transformation to "O(N)," redundant calculation is still performed.

The present invention has been made in view of the above problems, and has an object of providing three-dimensional image display devices and three-dimensional image display methods which allow a reduction in redundant calculation and high-speed obtainment of an optimum control image to be recorded on a display device.

DISCLOSURE OF THE INVENTION

A first aspect of the present invention is summarized as a three-dimensional image display device for displaying a three-dimensional image by irradiating illuminating light at an optical wavefront control unit which records a control image including a control image optimizing unit configured to calculate three-dimensional images corresponding to a group of control images based on constraints inherent to the optical wavefront control unit, select a control image corresponding to the three-dimensional image satisfying a predetermined condition from the group of control images, and record the selected control image on the optical wavefront control unit According to this invention, a "region of a three-dimensional image on which change of a pixel on the optical wavefront control unit has an effect (region to be calculated)" defined based on the constraints inherent to the optical wavefront control unit is taken into account to calculate a control image, so that redundant calculation can be reduced.

In the first aspect of the present invention, the control image optimizing unit may be configured to generate the group of control images by sequentially performing change processing on part of the control image, and sequentially calculate the three-dimensional images based on difference information about the control images before and after the change processing.

In the first aspect of the present invention, the control image optimizing unit may be configured to calculate the three-dimensional image in a region to be calculated defined by the constraints.

In the first aspect of the present invention, the control image may be constituted by phase distribution of an optical wavefront, and the control image optimizing unit may be configured to calculate the region to be calculated, based on a range in which phase modulation is possible on a display device constituting the optical wavefront control unit, and accuracy of the phase modulation.

In the first aspect of the present invention, the control image optimizing unit may be configured to calculate the region to be calculated, also taking account of amplitude modulation which occurs with the phase modulation.

In the first aspect of the present invention, the control image may be constituted by amplitude distribution of an optical wavefront, and the control image optimizing unit may be configured to calculate the region to be calculated, based on a range in which amplitude modulation is possible on a display device constituting the optical wavefront control unit, and accuracy of the amplitude modulation.

In the first aspect of the present invention, the control image optimizing unit may be configured to calculate the region to be calculated, also taking account of phase modulation which occurs with the amplitude modulation.

A second aspect of the present invention is summarized as a three-dimensional Image display method for displaying a three-dimensional image by irradiating illuminating light at an optical wavefront control unit which records a control image including the steps of calculating three-dimensional images corresponding to a group of control images based on constraints inherent to the optical wavefront control unit; selecting a control image corresponding to the three-dimensional image satisfying a predetermined condition from the group of control images; and displaying the selected control image on the optical wavefront control unit.

BRIEF DESCRIPTION OF DRAWINGS

FIG. 6 is a diagram for comparing calculation amounts in a three-dimensional image display device according to a related art and calculation amounts in the three-dimensional image display device according to an embodiment of the present invention;

FIG. 7 is an overall configuration diagram of a three-dimensional image display device according to a second embodiment of the present invention; and FIG. 8 is a diagram showing an example of phase and amplitude modulation characteristics when voltage is applied to a display device in the three-dimensional image display device according to the second embodiment of the present invention.

BEST MODE FOR CARRYING OUT THE INVENTION (Configuration of Three-Dimensional Image Display Device in First Embodiment of the Invention)

Figure 1:
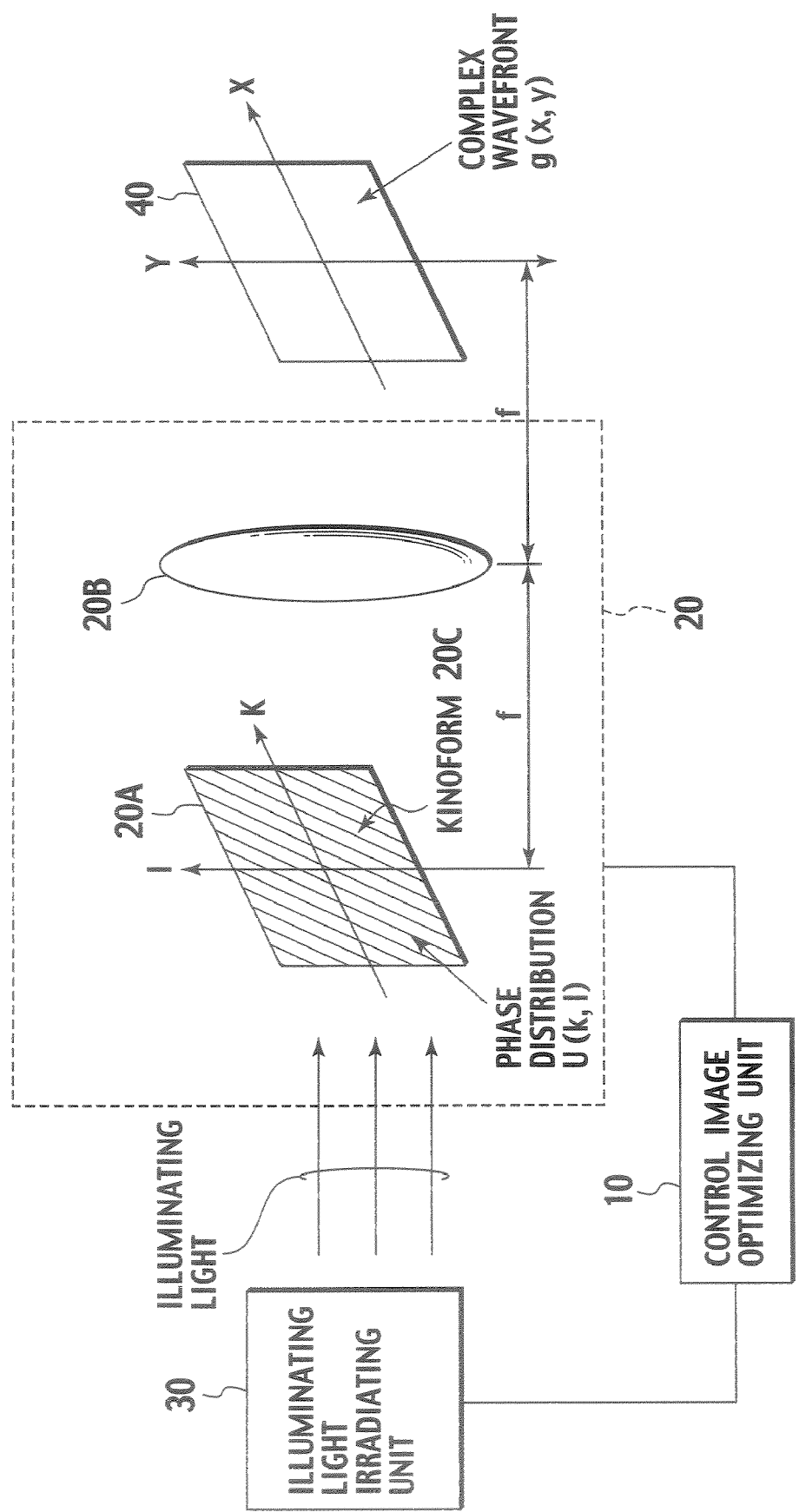
FIG. 1 is an overall configuration diagram of a three-dimensional image display device according to a first embodiment of the present invention.
Figure 2:
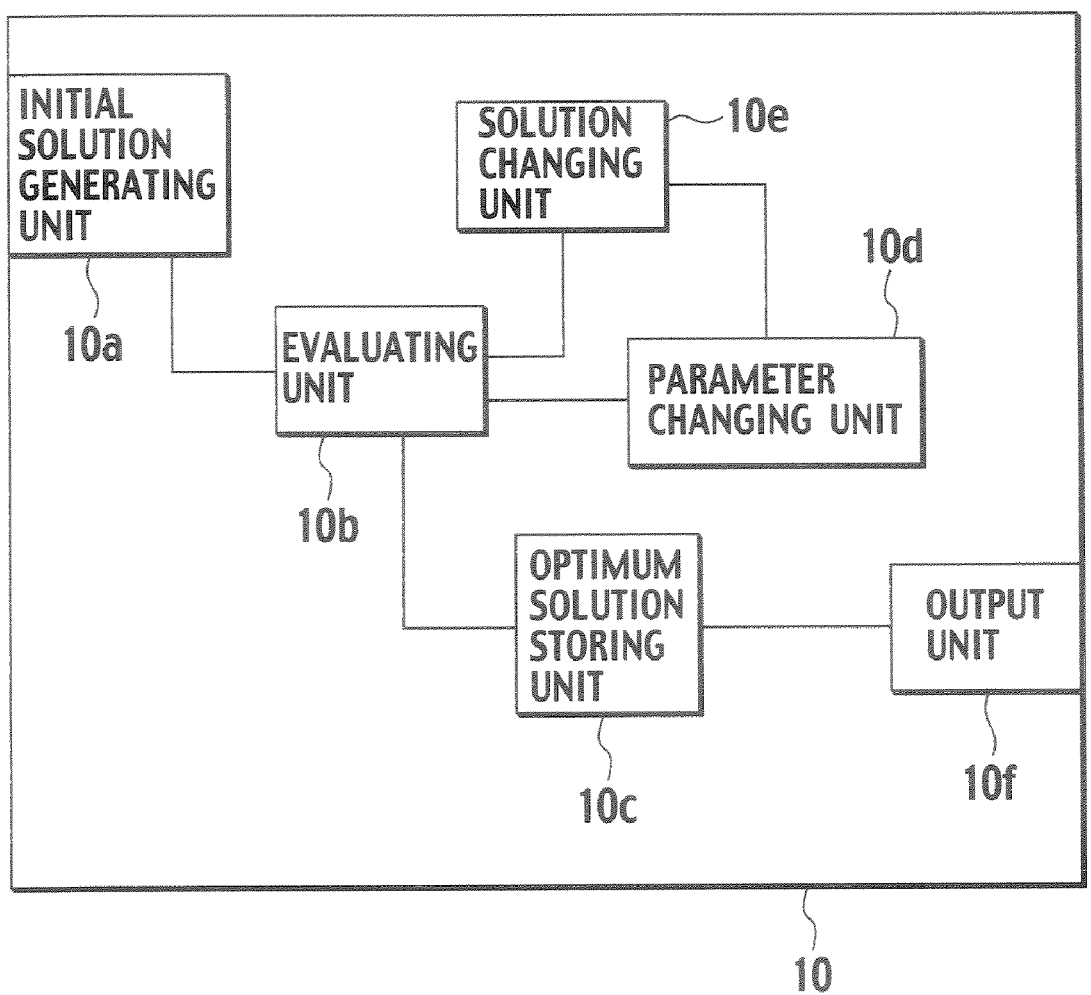
FIG. 2 is a functional block diagram of a control image optimizing unit in the three-dimensional image display device according to the first embodiment of the present invention.

With reference to FIGS. 1 and 2, the configuration of a three-dimensional image display device according to an embodiment of the present invention will be described. The three-dimensional image display device according to this embodiment displays a three-dimensional image by irradiating illuminating light at an optical wavefront control unit 20 which records a control image.

As shown in FIG. 1, the three-dimensional image display device according to this embodiment includes a control image optimizing unit 10, the optical wavefront control unit 20, an illuminating light irradiating unit 30, and a reconstructed image display unit 40.

The control image optimizing unit 10 is configured to calculate three-dimensional images corresponding to a group of control images based on constraints inherent to the optical wavefront control unit 20, select a control image corresponding to a three-dimensional image which satisfies a predetermined condition from the control image group, and record the selected control image on the optical wavefront control unit 20.

Here, a control image is recorded as a kinoform 20C on a display device 20A, and is constituted by the phase distribution U(k, l) of an optical wavefront.

The phase distribution U(k, l) of an optical wavefront on the kinoform 20c consists of "N $(=N_x \times N_y)$" pixels, and each pixel takes a value within a range of 0 to $2\pi$.

Specifically, the control image optimizing unit 10 is configured to apply a predetermined voltage to a position corresponding to each pixel of the control image on the display device 20A to record the control image as the kinoform 20c on the display device 20A

Also, the control image optimizing unit 10 is configured to sequentially perform change processing on part of a control image (part of pixels) to generate a group of control images, and sequentially calculate three-dimensional images based on difference information about the control images before and after the change processing, as will be described below.

In the three-dimensional image display device according to this embodiment, the above-described constraints depend on the characteristics of the display device 20A which constitutes a part of the optical wavefront control unit 20, as will be described below.

As shown in FIG. 2, the control image optimizing unit 10 includes an initial solution generating unit 10a, an evaluating unit 10b, an optimum solution storing unit 10c, a parameter changing unit 10d, a solution changing unit 10e, and an output unit 10f. The detailed functions of the units will be described below.

As shown in FIG. 1, the optical wavefront control unit 20 includes the display device 20A and a Fourier lens 20B. The display device 20A is configured to record a control image outputted from the control image optimizing unit 10 as the kinoform (phase distribution of an optical wavefront) 20C.

In the example of FIG. 1, the distance between the display device 20A and the Fourier lens 20B is "f", and the distance between the Fourier lens 20B and the reconstructed image display unit 40 is also "f". Here, "f" is the focal length of the Fourier lens.

The illuminating light irradiating unit 30 is configured to irradiate illuminating light onto the display device 20A which constitutes a part of the optical wavefront control unit 20, according to an instruction from the control image optimizing unit 10.

The reconstructed image display unit 40 is configured to display a reconstructed image g(x, y) on a complex wavefront showing a three-dimensional image corresponding to the above-described control image.

In the three-dimensional image display device according to this embodiment, illuminating light irradiated from the illuminating light irradiating unit 30 is phase-modulated within a range of 0 to $2\pi$ by the pixels on the kinoform 20C recorded on the display device 20A, and the phase-modulated illuminating light reaches the reconstructed image display unit 40 through the Fourier lens 20B, changing its direction of propagation, whereby a three-dimensional image corresponding to a control image is displayed.

Alternatively, the three-dimensional image display device according to this embodiment may be configured not to include the Fourier lens 20B.

(Operation of Three-Dimensional Image Display Device in First Embodiment of the Invention)

Figure 3:
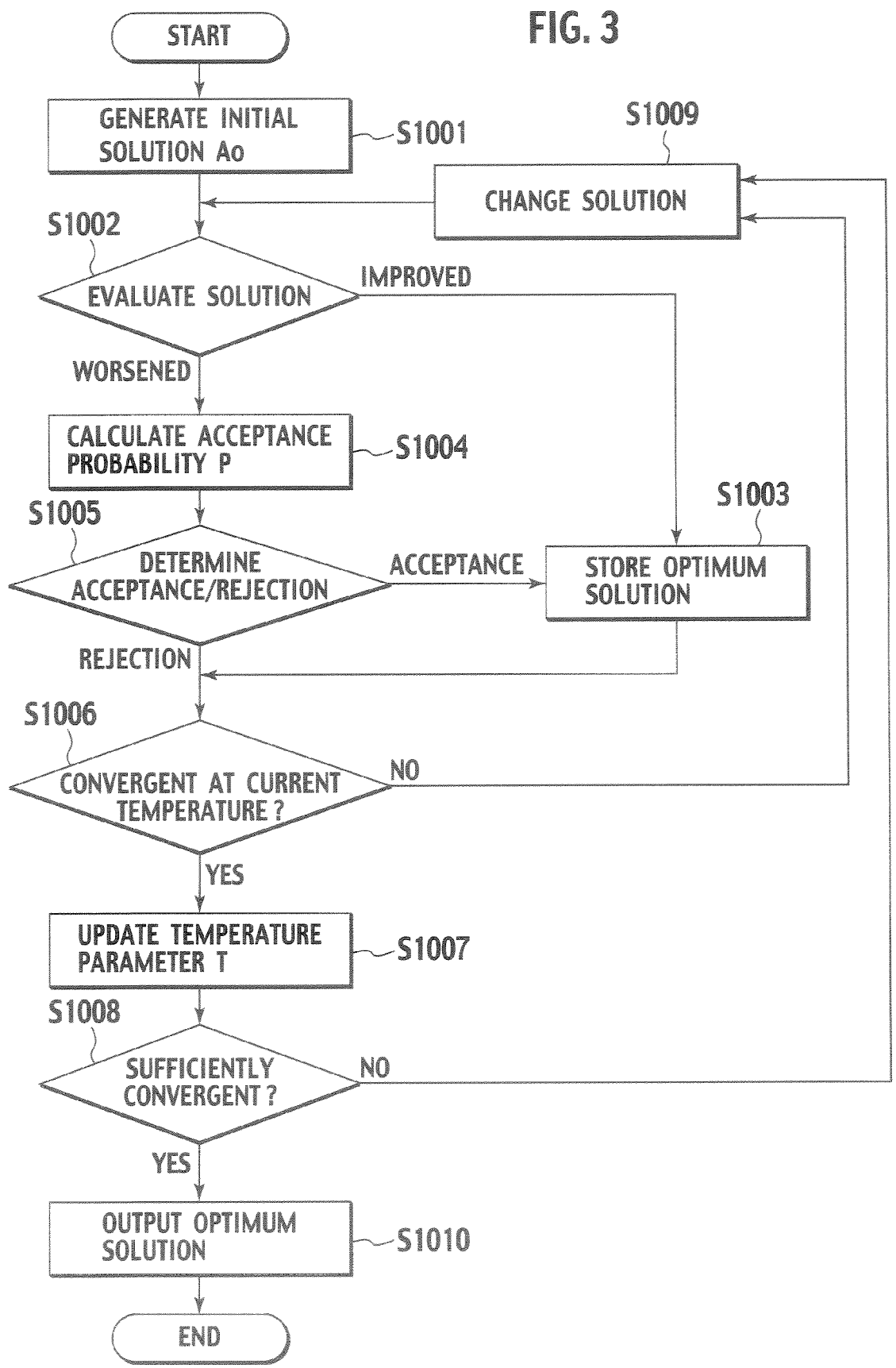
FIG. 3 is a flowchart illustrating the operation of the control image optimizing unit in the three-dimensional image display device according to the first embodiment of the present invention.

With reference to FIG. 3, the operation of the three-dimensional image display device according to this embodiment will be described below. Specifically, the operation of the control image optimizing unit 10 in the three-dimensional image display device according to this embodiment when generating an optimum control image to be recorded on the display device 20A as the kinoform 20C in order to display a three-dimensional image (reconstructed image) corresponding to an input image will be described.

As shown in FIG. 3, in step S1001, the initial solution generating unit 10a of the control image optimizing unit 10 generates an initial solution $A_0$ of a control image (that is, $U_0(k, l)$). Hereinafter, the reference sign of an initial solution "$A_0$" or "$U_0(k, l)$" will be used depending on the situation.

Specifically, the initial solution generating unit 10a assigns random values to each pixel which constitutes the control image. For example, when each pixel has the data normalized at 256 levels, the initial solution generating unit 10a assigns a random number from 0 to 256 to each pixel, and multiplies the assigned random numbers by $2\pi/256$, thereby generating an initial solution $A_0$ of the control image, that is, an initial solution $U_0(k, l)$ of the phase distribution of each pixel.

In the initial solution $A_0$ generation processing (step S1001), since it is necessary to determine the value of every pixel, the calculation amount is "O(N)" where "N" is the number of pixels.

Here, the initial solution $A_0$ does not necessarily need to be a random value. This is because, with the Initial solution $A_0$ taking any value, a Move operation which changes a solution for the worse will be accepted almost 100% in a high-temperature state immediately after the start of experiment, and thus enough calculations by the "Simulated Annealing" method in a sufficiently-high-temperature state can have the same effect as generating a random initial value without degrading the performance of a finally obtained solution.

In step S1002, the evaluating unit 10b of the control image optimizing unit 10 evaluates the initial solution $U_0(k, l)$ outputted from the initial solution generating unit 10a or a solution $A_i$ outputted from the solution changing unit 10e (that is, $U_i(k, l)$) Hereinafter, the reference sign "$A_i$" or "$U_i(k, l)$" of a solution outputted from the solution changing unit 10e will be used depending on the situation.

First, evaluation processing of an initial solution $U_0(k, l)$ by the evaluating unit 10b will be described. The evaluating unit 10b calculates a reconstructed image $g_0(x, y)$ from the initial solution $U_0(k, l)$, based on an expression (1):

$$g_0(x, y) = \sum_k \sum_l U_0(k, l) \cdot \exp\left(i \cdot \frac{2\pi}{N(xk + xl)}\right) \quad \text{expression (1)}$$

Here, the addition interval in the expression (1) is N intervals with "k" from "$-N_x/2$" to "$N_x/2-1$" and with "l" from "$-N_y/2$" to "$N_y/2-1$", that is, represents the entire reconstructed image.

However, in actuality, depending on a factor such as the characteristics of the display device 20A, each pixel of the initial solution $U_0(k, l)$ does not have an effect on the entire reconstructed image.

Therefore, in this embodiment, the evaluating unit 10b is configured to consider only a region (visual region) A of the reconstructed image influenced by each pixel of the initial solution $U_0(k, l)$ as an addition interval when calculating the reconstructed image $g_0(x, y)$.

Figure 4:
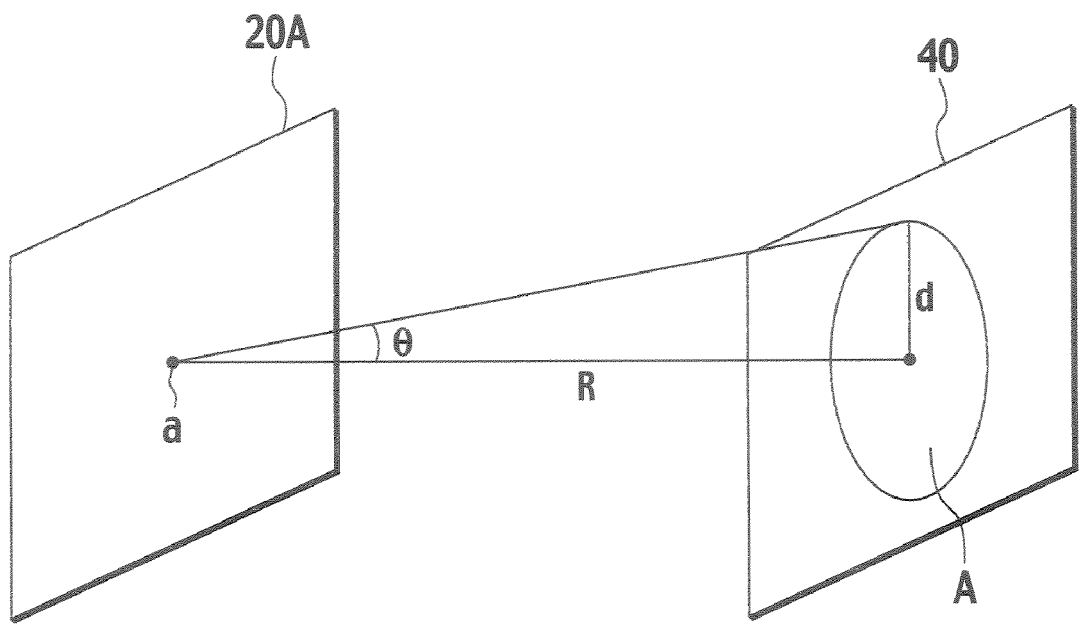
FIG. 4 is a diagram for illustrating a region defined by a diffraction limit in an optical wavefront control unit in the three-dimensional image display device according to the first embodiment of the present invention.

For example, as shown in FIG. 4, the region (visual region) "A" of the reconstructed image influenced by a pixel "a" is in the "$d \leqq R \tan \theta$" range where "R" is the distance between the display device 20A and the reconstructed image display unit 40 and "$\theta$" is the angle at which the traveling direction of illuminating light changes in the display device 20A. In this case, the evaluating unit 10b makes the region (visual region) "A" of the reconstructed image an addition interval.

That is, the control image optimizing unit 10 is configured to calculate a three-dimensional image ($g_0(x, y)$) with the inside of the region (visual region) "A" defined by the characteristics of the display device 20A as a region to be calculated for each pixel of the initial solution $U_0(k, l)$.

Also, the control image optimizing unit 10 may be configured to determine the above-described region to be calculated, based on a range in which phase modulation is possible on the display device 20A constituting a part of the optical wavefront control unit 20 and the accuracy of phase modulation.

For example, the range in which phase modulation is possible on the display device 20A and the accuracy of phase modulation is determined based on the characteristics, the resolution limit, and the like, of the display device 20A.

That is, depending on the type of the display device 20A used in the three-dimensional image display device according to this embodiment, the range in which phase modulation is possible is narrower than 0 to $2\pi$ (e.g., $0.1\pi$ to $1.9\pi$).

Also, depending on the type of the display device 20A used in the three-dimensional image display device according to this embodiment, the refraction angle of illuminating light can be changed in units of 0.1° (accuracy of phase modulation) or can be modulated in units of 1°.

Figure 5:
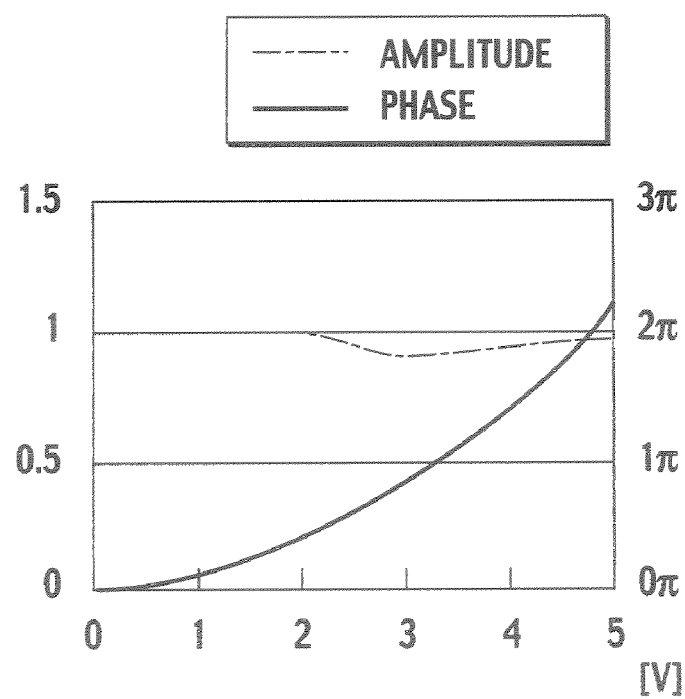
FIG. 5 is a diagram showing an example of phase and amplitude modulation characteristics when voltage is applied to a display device in the three-dimensional image display device according to the first embodiment of the present invention.

Here, the control image optimizing unit 10 can reduce the calculation amount required for obtaining an optimum control image, by making the region outside the visual region "A" illuminating light reaches at angles in the range in which phase modulation is possible, out of the region to be calculated (e.g. excluding the region from the above-described addition interval), or determining the degree of solution change in a Move operation based on the accuracy of phase modulation As shown in FIG. 5, in actuality, the amplitude of illuminating light is modulated not a little as the phase of the illuminating light is modulated by the kinoform (phase distribution of an optical wavefront) 20C recorded on the display device 20A. FIG. 5 is a diagram showing an example of the characteristics of the display device 20A used in the three-dimensional image display device according to this embodiment.

For this reason, the control image optimizing unit 10 may be configured to calculate the above-described region to be calculated, also taking account of amplitude modulation which occurs with phase modulation.

With the display device 20A shown in FIG. 5, when an applied voltage exceeds "2V", the amplitude of illuminating light is also modulated to be smaller as the phase of the illuminating light is modulated.

Since the pixels constituting a control image have a uniform size in this embodiment, the size of the visual region "A" formed by illuminating light of intensity above a certain level reaching the reconstructed image display unit 40 is determined based on the amplitude of illuminating light passing through each pixel. Specifically, the greater the amplitude of illuminating light passing through each pixel, the larger the size of the visual region "A" formed by illuminating light of intensity above a certain level reaching the reconstructed image display unit 40.

Accordingly, when the display device 20A shown in FIG. 5 is used, the amplitude of illuminating light passing through each pixel becomes smaller when an applied voltage exceeds "2v", so that the above-described region to be calculated can be made smaller.

While the above-described addition interval varies depending on the pixels on the kinoform 20C, the addition interval corresponding to each pixel is constant with respect to the size of the kinoform 20C (control image), so that the calculation amount is "O(1)". Accordingly, since the number of the pixels of the initial solution $U_0(k, l)$ is "N", the calculation amount in calculation of the entire reconstructed image is "O(N)".

Then, the evaluating unit 10b calculates a evaluation function $E(A_i)$ using expression (2)

$$E(Ai) = \sum_x \sum_y |I_0(x, y) - \alpha \cdot I(x, y)|^2 \quad \text{expression (2)}$$

Here, "$I_0$" is the intensity distribution of an input image, "I" is the intensity distribution of a reconstructed image $g_i(x, y)$ (the square of an absolute value on a complex wavefront of the reconstructed image), and "$\alpha$" is a scaling constant represented by $MAX(I_0)/MAX(I)$ In this case, in step S1003, the evaluating unit 10b stores the initial solution $A_0$ as an optimum solution in the optimum solution storing unit 10c.

Second, evaluation processing of a solution $U_i(k, l)$ by the evaluating unit 10b will be described.

The evaluating unit 10b calculates a reconstructed image $g_i(x, y)$ from the solution $U_i(k, l)$, based on expression (3):

$$g_i(x, y) = g_i - 1(x, y) + \{U_i(k, l) - U_i - 1(k, l)\} \cdot \exp[i \cdot 2\pi(xk/N_x + yl/N_y)] \quad (3)$$

Here, $g_i-1(x, y)$ is a reconstructed image before a Move operation, and $U_i-1(k, l)$ is a solution (the phase distribution of a wavefront) before the Move operation.

Calculation processing of the reconstructed image $g_i(x, y)$ is performed based on difference information about control images before and after the Move operation as shown in expression (3), and thus the calculation amount is "O(l)".

Then, the evaluating unit lob calculates an evaluation function $E(A_i)$ using expression (2), and evaluates whether the solution $U_i(k, l)$ is improved or not, based on the calculated evaluation function $E(A_i)$.

For example, the evaluating unit 10b calculates a worsened amount of $\Delta E = E(A_i) - E(A_i - 1)$, and evaluates that the solution $U_i(k, l)$ is improved when $\Delta E < 0$, and evaluates that the solution $U_i(k, l)$ is worsened when not $\Delta E < 0$.

When the evaluation is that the solution $U_i(k, l)$ is improved, in step S1003, the evaluating unit 10b stores the solution $A_i$ as an optimum solution in the optimum solution storing unit 10c. On the other hand, when the evaluation is that the solution $U_i(k, l)$ is worsened, the operation of the evaluating unit 10b proceeds to step S1003.

In step S1004, the evaluating unit 10b calculates, using expression (4), an acceptance probability P showing the probability of accepting the Move operation by which the solution $U_i(k, l)$ has been calculated.

$$P = \exp(-\Delta E/T) \quad (4)$$

Here, T represents a temperature parameter.

In step S1005, the evaluating unit 10b determines whether to accept the Move operation by which the solution $U_i(k, l)$ has been calculated or not, based on the calculated acceptance probability P.

When deciding to accept the Move operation, in step S1003, the evaluating unit 10b stores the solution $A_i$ as an optimum solution in the optimum solution storing unit 10c. On the other hand, when deciding not to accept the Move operation, the operation of the evaluating unit 10b proceeds to step S1006.

Instep S1006, the evaluating unit 10b determines whether the evaluation of the solution $A_i$ is convergent or not at the current temperature. Specifically, in calculation of an optimum solution based on the temperature parameter T, the evaluating unit 10b determines whether a sufficient number of Move operations have been performed or not. The determination is performed by a method similar to that in the "Simulated Annealing" method.

When it is determined that the evaluation of the solution $A_i$ is convergent, the operation of the evaluating unit 10b proceeds to step S1007, and when it is determined that the evaluation of the solution $A_i$ is not convergent, proceeds to step S1009.

In step S1007, the parameter changing unit 10d of the control image optimizing unit 10 updates the temperature parameter T.

In step S1005, the evaluation unit 10b determines whether a sufficient number of Move operations have been performed or not, based on measurements from optimum solution calculations. The determination is performed by a method similar to that in the conventional "Simulated Annealing" method.

When it is determined that a sufficient number of Move operations have been performed, the process proceeds to step S1010, and when it is determined that a sufficient number of Move operations have not been performed, proceeds to step S1009

In step S1009, the solution changing unit 10e of the control image optimizing unit 10 changes the phase of a random pixel of the current solution "$U_i-1(k, l)$" to a random value to calculate a solution "$U_i(k, l)$" and outputs it to the evaluating unit 10b.

In step S1010, the output unit 10f of the control image optimizing unit 10 outputs an optimum solution stored in the optimum solution storing unit 10c to the display device 20A.

As described above, the control image optimizing unit 10 according to this embodiment is configured to sequentially perform change processing (Move operations) on part of a control image (that is, each pixel constituting a part of the control image) using the "Simulated Annealing" method, thereby generating a group of control images (solutions "$U_i$ (k, l)"), and sequentially calculate three-dimensional images reconstructed images $g_i(x, y)$), based on difference information about the control images before and after the change processing (Move operations).

(Calculation Amount in Three-Dimensional Image Display Device in First Embodiment of the Invention)

With reference to FIG. 6, a comparison will be made between calculation amounts in the three-dimensional image display device according to this embodiment and calculation amounts in a three-dimensional image display device according to a related art.

The calculation amount in initial solution generation processing (step S1001 in FIG. 3) in the three-dimensional image display device according to the related art was "O(NlogN)" with respect to the size N of the kinoform 20C (control image), while it is reduced to "O(N)" in the three-dimensional image display device according to this embodiment.

The calculation amount in initial solution evaluation processing (step S1002 in FIG. 3) in the three-dimensional image display device according to the related art was "O(NlogN)", while it is reduced to "O(N)" in the there-dimensional image display device according to this embodiment by limiting the region (visual region) "A" of a reconstructed image influenced by each pixel on the kinoform 20C (control image), that is, making the region outside the region of the reconstructed image influenced by each pixel on the kinoform 20 (control image) (region in which an effect from each pixel cannot be displayed) outside the region to be calculated.

The calculation amount in solution evaluation processing after a Move operation (step S1002 in FIG. 3) in the three-dimensional image display device according to the related art is "O(N)", while it is reduced to "O(l)", that is, to a constant time, in the three-dimensional image display device according to this embodiment.

The calculation amount in solution change processing (step S1009 in FIG. 3) is "O(l)", that is, a constant time, both in the three-dimensional image display device according to the related art and in the three-dimensional image display device according to this embodiment.

(Effects in Three-Dimensional Image Display Device in First Embodiment of the Invention)

According to the three-dimensional image display device in the first embodiment of the present invention, the "region (region to be calculated) of a three-dimensional image ($g_i(x, y)$) on which change of a pixel recorded on the display device 20A in the optical wavefront control unit 20 has an effect" defined based on constraints inherent to the optical wavefront control unit 20 (such as the characteristics and the resolution limit of the display device 20A) is taken into account to calculate a control image ($U_i(k, l)$) so that redundant calculation can be reduced.

Also, according to the three-dimensional image display device in the first embodiment of the present invention, the fact that the amplitude of illuminating light is modulated as the phase of the illuminating light is modulated in the display device 20A is taken into account to calculate a control image ($U_i(k, l)$), so that redundant calculation can be further reduced.

(Three-Dimensional Image Display Device in Second Embodiment of the Invention)

As shown in FIG. 7, a three-dimensional image display device according to a second embodiment of the present invention is configured to use an amplitude hologram 20D Instead of the kinoform (phase hologram) 20C used in the three-dimensional image display device according to the above-described first embodiment.

A control image recorded on a display device 20A in this embodiment is constituted by the amplitude distribution U(k, l) of an optical wavefront.

In the example of FIG. 7, an optical wavefront control unit 20 is configured not to include a Fourier lens 20B, but may be configured to include a Fourier lens 20B as in the three-dimensional image display device according to the first embodiment.

In this embodiment, a control image optimizing unit 10 is configured to calculate the above-described region to be calculated (region in which a three-dimensional image is calculated), based on a range in which amplitude modulation is possible in the display device 20A constituting the optical wavefront control unit 20 and the accuracy of amplitude modulation.

For example, the range in which amplitude modulation is possible in the display device 20A and the accuracy of amplitude modulation is determined based on the characteristics, the resolution limit, and the like, of the display device 20A.

In amplitude modulation, the size of a visual region "A" formed by illuminating light of intensity above a certain level reaching a reconstructed image display unit 40 is determined based on the size of pixels constituting a control image and the amplitude of illuminating light passing through the pixels. Therefore, a range in which concentration of Illuminating light can be controlled can be estimated, based on the size of the pixels (pixel width).

Specifically, depending on the type of the display device 20A used in the three-dimensional image display device according to this embodiment, the amplitude amount "0" of transmitted illuminating light cannot be attained, and the amplitude amount "0" of transmitted illuminating light may be excluded from a range in which amplitude modulation is possible (see FIG. 8).

Also, depending on the type of the display device 20A used in the three-dimensional image display device according to this embodiment, amplitude cannot be linearly controlled in proportion to applied voltage, and a range in which such linear control is impossible (a range in which an applied voltage is lower than or equal to 2V in the example of FIG. 8) maybe excluded from a range in which amplitude modulation is possible.

Also, depending on the type of the display device 20A used n the three-dimensional image display device according to this embodiment, the amplitude transmittance of illuminating light passing through the pixels can be changed in units of 0.1 (accuracy of amplitude modulation), or can be modulated in units of 0.01 (accuracy of amplitude modulation).

Also, depending on the performance of the control image optimizing unit 10 used in the three-dimensional image display device according to this embodiment, a voltage applicable to each pixel can be changed in units of 0.1V (accuracy of amplitude modulation), or can be modulated in units of 1 V.

Here, the control image optimizing unit 10 can calculate control images, excluding amplitude values outside the range in which amplitude modulation is possible from solutions, or determine the degree of solution change in Move operations, based on the accuracy of amplitude modulation thereby reducing the calculation amount required for obtaining an optimum control image.

In actuality, as shown in FIG. 8 the phase of illuminating light is modulated not a little as the amplitude of the illuminating light is modulated by the amplitude hologram (amplitude distribution of an optical wavefront) 20D recorded on the display device 20A. FIG. 8 is a diagram showing an example of the characteristics of the display device 20A used in the three-dimensional image display device according to this embodiment.

For this reason, the control image optimizing unit 10 may be configured to calculate the above-described region to be calculated, also taking account of the phase modulation which occurs with the amplitude modulation.

For example, when the display device 20A shown in FIG. 8 is used, and the refraction angle of illuminating light passing through each pixel is changed in proportion to applied voltage, making the visual region "A" smaller, the above-described region to be calculated can be made smaller.

While the present invention has been described in detail with the embodiments above, it is obvious to those skilled in the art that the present invention is not limited to the embodiments described in this application. The devices in the present invention can be implemented as altered and modified forms without departing from the spirit and scope of the present invention as defined by the description of the claims. The description in this application is thus for illustrative purposes, and is not meant to limit the present invention.

INDUSTRIAL APPLICABILITY

As described above, according to the present invention, three-dimensional image display devices and three-dimensional image display methods can be provided which allow a reduction in redundant calculation and high-speed obtainment of an optimum control image ("kinoform (phase distribution of an optical wavefront)" or "amplitude hologram (amplitude distribution of an optical wavefront)") to be recorded on an optical wavefront control unit (display device).

The invention claimed is:

1. A three-dimensional image display device which irradiates illuminating light on a display device and displays a three-dimensional image on an image reconstruction display unit using illuminating light transmitted through the display device, comprising a control image optimizing unit, wherein the control image optimizing unit is configured to:
   apply a voltage to a position corresponding to each pixel of a control image on the display device;
   calculate a solution of the three-dimensional image based on a solution of the control image included in a calculation target region, and perform an evaluating process for evaluating whether or not the solution of three-dimensional image is an optimized solution;
   perform a solution changing process for changing the solution of the control image included in the calculation target region by a move operation;
   determine an optimized solution of three-dimensional image by repeating the evaluating process and the solution changing process;
   record a control image on the display device based on the solution of the control image corresponding to the optimized solution of the three-dimensional image; and
   exclude, from the calculation target region, a region of pixels where an amplitude of the illuminating light transmitted through the display device may not be linearly controlled due to the applied voltage at each pixel within the excluded region being with a range where the amplitude does not increase as the voltage increases.

2. The three-dimensional image display device according to claim 1, wherein,
   a distance between the display device and the image reconstruction display unit is R,
   an angle of a traveling direction of the illuminating light changed at the display device is $\theta$,
   a visual region of the image reconstruction display unit is defined by the R and the $\theta$, and
   the calculation target region corresponds to the visual region of the image reconstruction display.

3. A three-dimensional image display method which irradiates illuminating light on a display device and displays a three-dimensional image on an image reconstruction display unit using illuminating light transmitted through the display device, comprising:
   applying a voltage to a position corresponding to each pixel of a control image on the display device;
   calculating a solution of the three-dimensional image based on a solution of the control image included in a calculation target region, and performing an evaluating process for evaluating whether or not the solution of the three-dimensional image is an optimized evaluation;
   performing a solution changing process for changing the solution of the control image included in the calculation target region by a move operation;
   determining an optimized solution of the three-dimensional image by repeating the evaluating process and the solution changing process;
   recording a control image on the display device based on the solution of the control image corresponding to the optimized solution of three-dimensional image; and
   excluding, from the calculation target region, a region of pixels where an amplitude of the illuminating light transmitted through the display device may not be linearly controlled due to the applied voltage at each pixel within the excluded region being with a range where the amplitude does not increase as the voltage increases.

* * * * *